J. M. BONG.
NUT LOCK.
APPLICATION FILED SEPT. 17, 1913.

1,149,329.

Patented Aug. 10, 1915.

Witnesses:
Carrie E. Young
May Downey.

Inventor:
John M. Bong
By Elephant Young
Attorneys

UNITED STATES PATENT OFFICE.

JOHN M. BONG, OF MILWAUKEE, WISCONSIN.

NUT-LOCK.

1,149,820.

Specification of Letters Patent. Patented Aug. 10, 1915.

Application filed September 17, 1913. Serial No. 790,312.

*To all whom it may concern:*

Be it known that I, JOHN M. BONG, a citizen of the United States, and resident of Milwaukee, in the county of Milwaukee and State of Wisconsin, have invented certain new and useful Improvements in Nut-Locks; and I do hereby declare that the following is a full, clear, and exact description thereof.

My invention has for its object to provide a simple, economical and effective nut-lock, the construction and arrangement being such that an integral nipple portion of the nut is contracted by a choked bore washer incidental to seating of the nut, whereby the nut threads in the nipple portion are pressed tightly into engagement with the threads of the bolt member and thus said nut is firmly locked to resist all tendency to loosen from its seat through vibration or inadvertent twist.

With the above object in view the invention consists in certain peculiarities of construction and combination of parts as set forth hereinafter with reference to the accompanying drawings and subsequently claimed.

Figure 1:
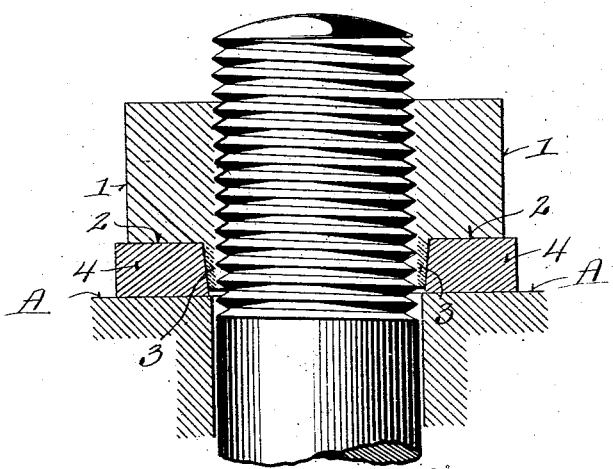
Figure 2:
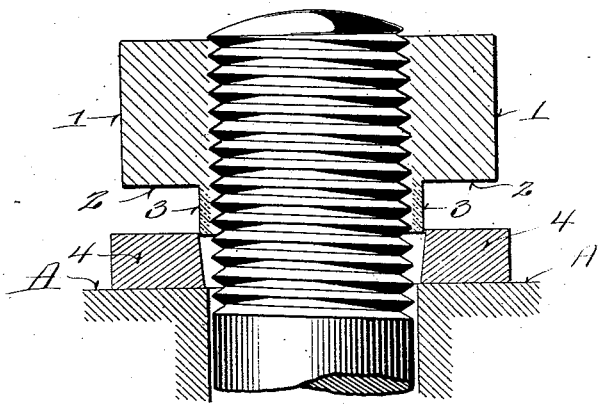

In the drawings Figure 1 represents a longitudinal sectional elevation of a nut-lock embodying the features of my invention, the members being shown in their locked position, and Fig. 2, a similar sectional view showing the nut in position to be engaged by a washer-member, which member effects a locking operation after the nut has been seated.

Referring by characters to the drawings, 1 represents a nut provided with a shoulder 2 having a nipple 3 extending therefrom, the thickness of which nipple between its threaded bore and circular face is of such reduced cross-sectional area as to render it capable of being slightly contracted under the application of power. The outer horizontal face of the nipple is preferably parallel to the axis of the nut and the end of the same is arranged to enter the large end of a tapered bored washer 4, as shown in Fig. 2, which washer abuts an opposing wall A.

It is manifest that when the parts are in the position shown in Fig. 2 and the nut be run on the bolt or spindle to its seat the tapered bore of the washer will contract the nipple section of said nut gradually by telescopic engagement therewith and in such manner that the nut threads carried by said nipple will be tightly embedded into the spindle or bolt threads thereunder, resulting in a frictional grip between the threaded members, which grip will be of sufficient tenacity to prevent the nut from loosening under vibration or through other causes, it being understood that the said nut can be run off by the application of a wrench without marring the threads.

It is also obvious that the choke bore engagement between the nipple and nut will not have any appreciable tendency to expand the washer due to the fact that the cross-sectional area of said nut in the line of resistance is much greater than the corresponding area of the nipple. Hence as the nipple is forced through the tapered bore of the washer, a wedging action takes place, whereby the outer straight face of said nipple will change its shape slightly to somewhat taper form, approximately corresponding to the tapered bore of the washer, whereby the pressure between the threads of the members will be gradual from the outer end of the nipple, the said pressure decreasing in a direction toward the nut body.

I claim:

In a nut-lock a nut body having a thin uninterrupted circular nipple extending from its base, the same being uniform in diameter throughout its length; in combination with an engaging washer for the nipple the interior face of which is tapered with respect to the straight outer face of the continuous circular nipple, whereby the outer end only of said nipple is engaged by the washer to progressively compress the nipple into tapered form as it travels to its seat therein whereby the disturbance of the molecules of the nipple caused through its change of form will be gradual from the engaged end to the base thereof to thus prevent undue crystallization at any point.

In testimony that I claim the foregoing I have hereunto set my hand at Milwaukee in the county of Milwaukee and State of Wisconsin in the presence of two witnesses.

JOHN M. BONG.

Witnesses:
GEO. W. YOUNG,
M. E. DOWNEY.